United States Patent
Sanchez

(10) Patent No.: US 9,557,151 B1
(45) Date of Patent: Jan. 31, 2017

(54) COMBINATION TAPE MEASURE AND CUTTER

(71) Applicant: Macario Sanchez, Hialeah, FL (US)

(72) Inventor: Macario Sanchez, Hialeah, FL (US)

( * ) Notice: Subject to any disclaimer, the term of this patent is extended or adjusted under 35 U.S.C. 154(b) by 97 days.

(21) Appl. No.: 14/685,881

(22) Filed: Apr. 14, 2015

(51) Int. Cl.
*G01B 3/10* (2006.01)
*B26D 7/27* (2006.01)

(52) U.S. Cl.
CPC ............... *G01B 3/1084* (2013.01); *B26D 7/27* (2013.01); *G01B 3/1041* (2013.01); *G01B 3/1056* (2013.01); *G01B 2003/1089* (2013.01)

(58) Field of Classification Search
CPC ............ G01B 2003/1089; G01B 3/1056; G01B 3/1084; G01B 2003/1074; G01B 2003/1076; G01B 3/1041; G01B 3/1071; G01B 2003/1046; G01B 2003/1048; G01B 2003/1066; G01B 2003/1087
USPC ............................................ 33/668, 768, 770
See application file for complete search history.

(56) References Cited

U.S. PATENT DOCUMENTS

| | | | | |
|---|---|---|---|---|
| 4,255,856 A | * | 3/1981 | Mackie | B26B 29/06 33/770 |
| 5,289,637 A | * | 3/1994 | Coffey | B26B 29/06 30/233 |
| 5,542,184 A | * | 8/1996 | Beard | B26B 29/06 33/770 |
| 6,115,931 A | * | 9/2000 | Arcand | B25H 7/04 33/668 |
| 7,260,898 B2 | * | 8/2007 | Snelson | B25F 1/00 33/668 |
| 7,676,950 B2 | * | 3/2010 | Ogilvie | B25H 7/00 33/760 |
| 8,020,312 B1 | * | 9/2011 | McGahan | B26B 29/06 33/770 |
| 8,819,954 B1 | * | 9/2014 | Fernandez | G01B 3/1084 33/768 |
| 2007/0068026 A1 | * | 3/2007 | Snelson | B25F 1/00 33/668 |
| 2009/0249636 A1 | * | 10/2009 | Reda | B26B 29/06 33/760 |
| 2012/0073152 A1 | * | 3/2012 | McGahan | B26B 29/06 33/760 |

* cited by examiner

*Primary Examiner* — Yaritza Guadalupe-McCall
(74) *Attorney, Agent, or Firm* — Stevenson IP, LLC

(57) ABSTRACT

A combination tape measure and cutter including a tape measure having a housing, a lock, a measuring tape, and a hooked tab. An opening is continuously disposed within the hooked tab, and a cutting blade is disposed within the opening. A screw having a thread portion and a head portion, with a spring continuously disposed around the thread portion. The spring has a decompressed position and an alternate compressed position. The spring is in the decompressed position when the cutting blade is entirely disposed within the opening. The spring is in the compressed position when the tip of the cutting blade is disposed below the hooked tab. The tip of the cutting blade is configured to cut a material disposed underneath the hooked tab.

3 Claims, 3 Drawing Sheets

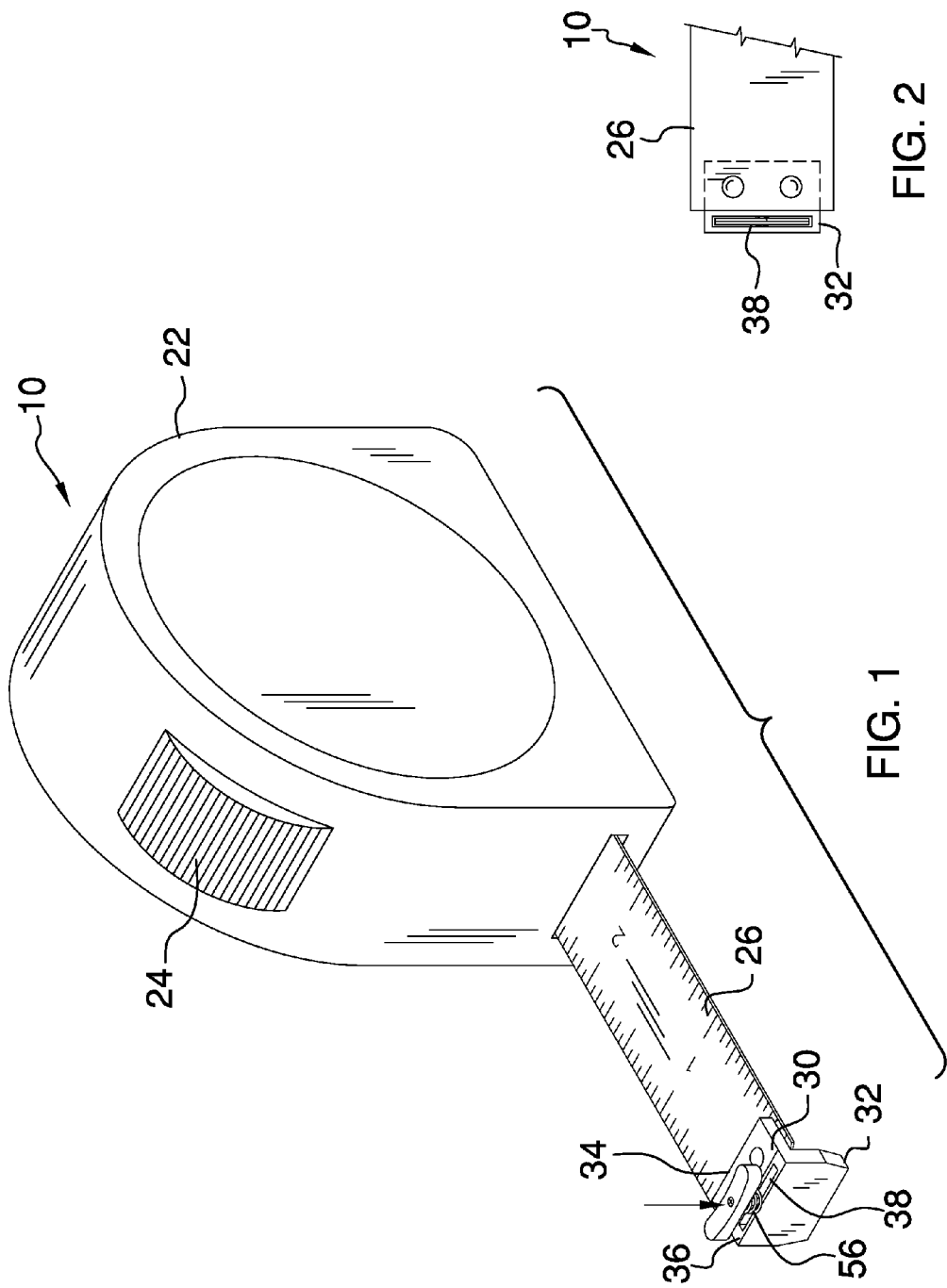

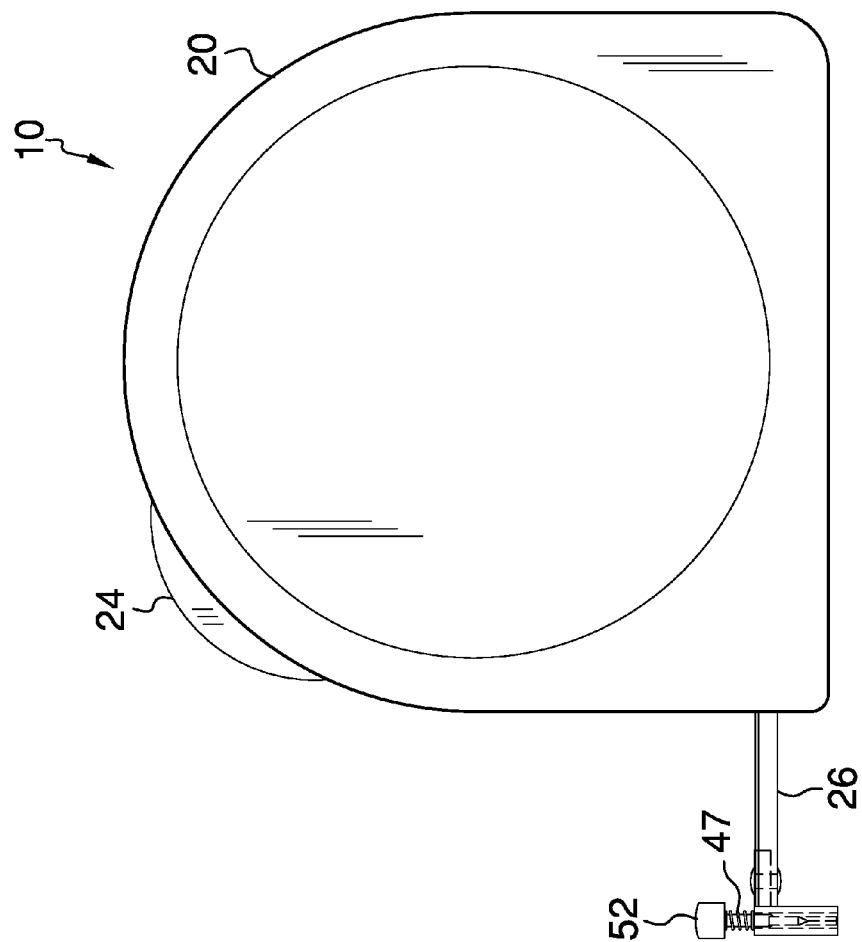
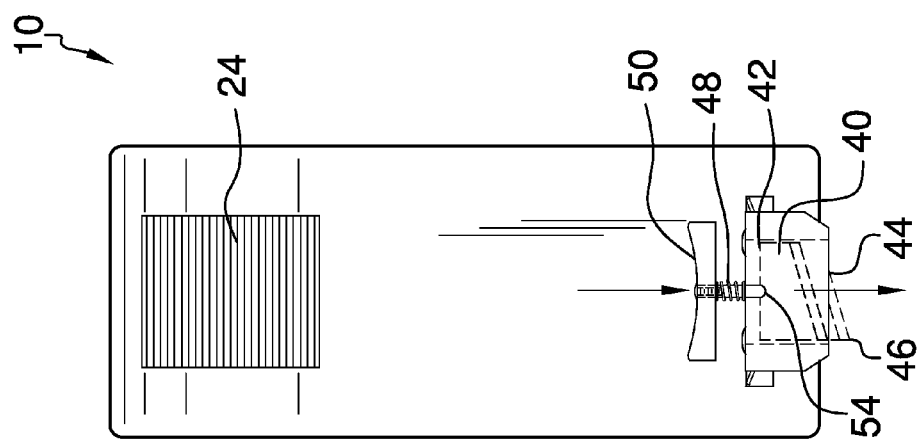

COMBINATION TAPE MEASURE AND CUTTER

BACKGROUND OF THE INVENTION

Various types of measuring tapes are known in the prior art. However, what has been needed is a combination tape measure and cutter having a tape measure with a hooked tab, wherein an opening is disposed in the hooked tab. What has further been needed is a cutting blade disposed within the opening, a screw, and a spring having a decompressed position and an alternate compressed position. When the spring is in the compressed position, a tip of the cutting blade is disposed below the hooked tab and is configured to cut a material disposed underneath the hooked tab. Thus, the combination tape measure and cutter, which allows for a material to be simultaneously measured and cut, creates efficiencies in the cost and time spent on a project, while increasing the accuracy of the work.

FIELD OF THE INVENTION

The present invention relates to measuring tapes, and more particularly, to a combination tape measure and cutter that has a cutting blade disposed within an opening within a hooked tab.

SUMMARY OF THE INVENTION

The general purpose of the present combination tape measure and cutter, described subsequently in greater detail, is to provide a tape measure which has many novel features that results in a combination tape measure and cutter which is not anticipated, rendered obvious, suggested, or even implied by prior art, either alone or in combination thereof.

To accomplish this, the present combination tape measure and cutter includes a tape measure having a housing, a lock, a measuring tape, and a hooked tab. The hooked tab has a top surface and a bottom surface. The top surface has a right side and a left side. An opening is continuously disposed within the hooked tab left side from the top surface to the bottom surface. A cutting blade having a top side, a bottom side, and a tip is disposed within the opening. The surface area of the cutting blade is configured to substantially conform to the surface area of the opening. The combination tape measure and cutter further comprises a screw having a thread portion and a head portion. Each of the thread portion and the head portion has a top end and a bottom end. The head portion is centrally disposed above the top surface of the left side of the hooked tab. The top end of the thread portion is medially disposed on the bottom end of the head portion, and the bottom end of the thread portion is disposed on the cutting blade within the opening on the hooked tab.

A spring is continuously disposed around the thread portion from the top end of the thread portion to the top surface of the left side of the hooked tab. The spring has a decompressed position and an alternate compressed position. The spring is in the decompressed position when the cutting blade is entirely disposed within the opening. In the decompressed position, the hooked tab is configured to be a blade cover for the cutting blade. The spring is in the compressed position when the tip of the cutting blade is disposed below the bottom surface of the hooked tab. The tip of the cutting blade is configured to cut a material disposed underneath the hooked tab. The material can optionally be a gypsum wallboard.

Thus has been broadly outlined the more important features of the present combination tape measure and cutter so that the detailed description thereof that follows may be better understood and in order that the present contribution to the art may be better appreciated.

BRIEF DESCRIPTION OF THE DRAWINGS

Figures

FIG. 1 is a front isometric view.
FIG. 2 is a bottom plan view.
FIG. 3 is a front elevation view.
FIG. 4 is a side elevation view.

DETAILED DESCRIPTION OF THE DRAWINGS

Figure 5:
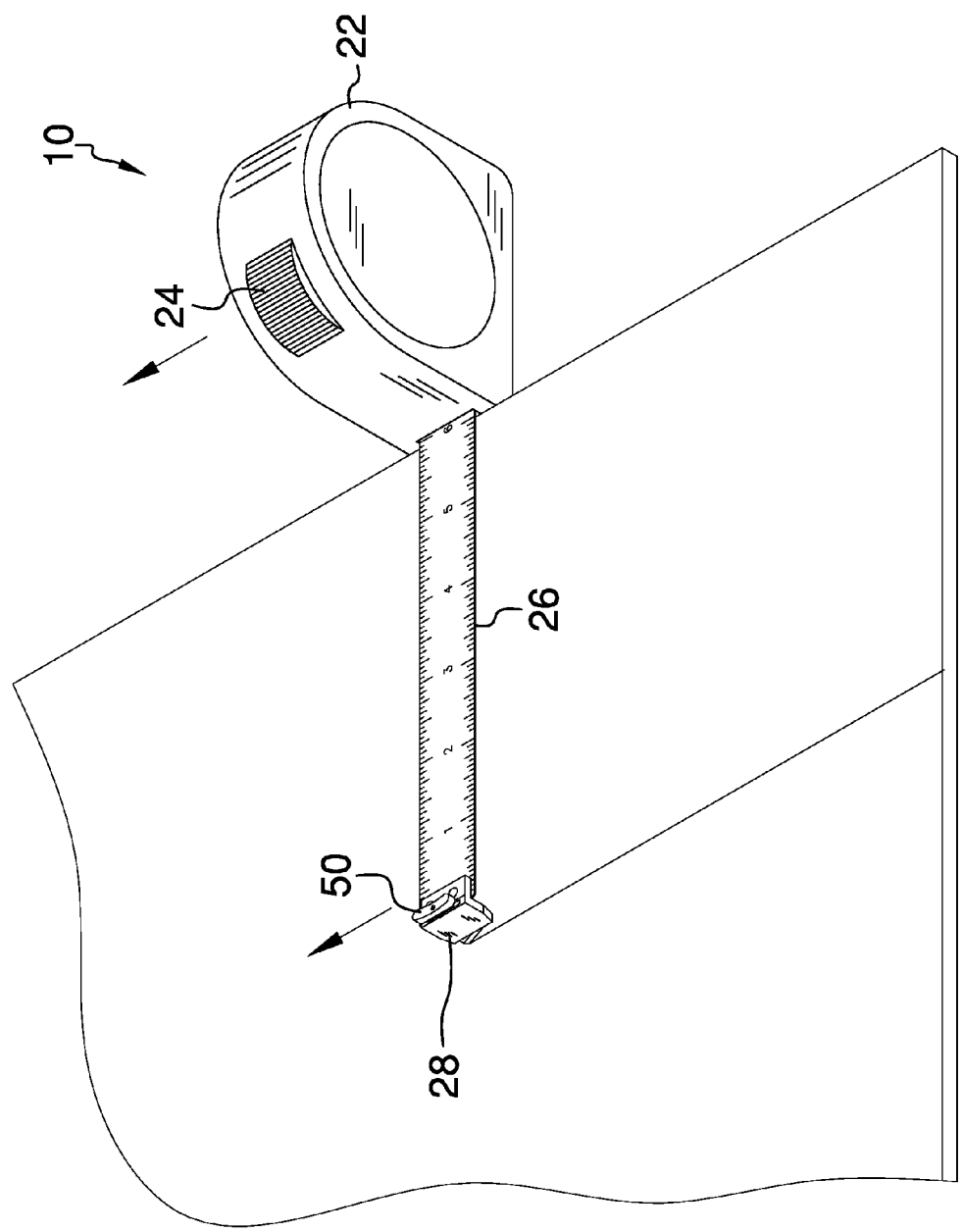
FIG. 5 is an in-use view.

With reference now to the drawings, and in particular FIGS. 1 through 5 thereof, an example of the instant combination tape measure and cutter employing the principles and concepts of the present combination tape measure and cutter and generally designated by the reference number 10 will be described.

Referring to FIGS. 1 through 5 the present combination tape measure and cutter 10 is illustrated. The combination tape measure and cutter 10 includes a tape measure 20 having a housing 22, a lock 24, a measuring tape 26, and a hooked tab 28. The hooked tab 28 has a top surface 30 and a bottom surface 32. The top surface 30 has a right side 34 and a left side 36. An opening 38 is continuously disposed within the left side 36 of the hooked tab 28 from the top surface 30 to the bottom surface 32. A cutting blade 40 is disposed within the opening 38 having a top side 42, a bottom side 44, and a tip 46. The combination tape measure and cutter 10 further comprises a screw 47 having a thread portion 48 and a head portion 50. Each of the thread portion 48 and the head portion 50 has a top end 52 and a bottom end 54. The head portion 50 is centrally disposed above the top surface 30 of the left side 36 of the hooked tab 28. The top end 52 of the thread portion 48 is medially disposed on the bottom end 54 of the head portion 50, and the bottom end 54 of the thread portion 48 is disposed on the cutting blade 40 within the opening 38 on the hooked tab 28. A spring 56 is continuously disposed around the thread portion 48 from the top end 52 of the thread portion 48 to the top surface 30 of the left side 36 of the hooked tab 28. As best shown in FIGS. 4 and 5, the spring 56 has a decompressed position and an alternate compressed position, respectively. The spring 56 is in the decompressed position when the cutting blade 40 is entirely disposed within the opening 38. The spring 56 is in the compressed position when the tip 46 is disposed below the bottom surface 32 of the hooked tab 28.

What is claimed is:
1. A combination tape measure and cutter comprising:
   a tape measure having a housing, a lock, a measuring tape, and a hooked tab having a top surface and a bottom surface;
   wherein the top surface has a right side and a left side;
   an opening continuously disposed within the hooked tab left side from the top surface to the bottom surface;
   a cutting blade disposed within the opening, wherein the cutting blade has a top side, a bottom side, and a tip;
   wherein the surface area of the cutting blade is configured to substantially conform to the surface area of the opening;

a screw having a thread portion and a head portion, each of the thread portion and the head portion having a top end and a bottom end;

wherein the head portion is centrally disposed above the top surface of the hooked tab left side;

wherein the thread portion top end is medially disposed on the head portion bottom end and the thread portion bottom end is disposed on the cutting blade within the opening on the hooked tab;

a spring continuously disposed around the thread portion from the thread portion top end to the top surface of the hooked tab left side;

wherein the spring has a decompressed position and an alternate compressed position;

wherein the spring is in the decompressed position when the cutting blade is entirely disposed within the opening;

wherein the spring is in the compressed position when the tip of the cutting blade is disposed below the hooked tab bottom surface;

wherein the tip of the cutting blade is configured to cut a material disposed underneath the hooked tab.

2. The combination tape measure and cutter of claim 1 wherein the material is a gypsum wallboard.

3. A combination tape measure and cutter comprising:

a tape measure having a housing, a lock, a measuring tape, and a hooked tab having a top surface and a bottom surface;

wherein the top surface has a right side and a left side;

an opening continuously disposed within the hooked tab left side from the top surface to the bottom surface;

a cutting blade disposed within the opening, wherein the cutting blade has a top side, a bottom side, and a tip;

wherein the surface area of the cutting blade is configured to substantially conform to the surface area of the opening;

a screw having a thread portion and a head portion, each of the thread portion and the head portion having a top end and a bottom end;

wherein the head portion is centrally disposed above the top surface of the hooked tab left side;

wherein the thread portion top end is medially disposed on the head portion bottom end and the thread portion bottom end is disposed on the cutting blade within the opening on the hooked tab;

a spring continuously disposed around the thread portion from the thread portion top end to the top surface of the hooked tab left side;

wherein the spring has a decompressed position and an alternate compressed position;

wherein the spring is in the decompressed position when the cutting blade is entirely disposed within the opening;

wherein the spring is in the compressed position when the tip of the cutting blade is disposed below the hooked tab bottom surface;

wherein the tip of the cutting blade is configured to cut a material disposed underneath the hooked tab;

wherein the material is a gypsum wallboard.

\* \* \* \* \*